US012730010B2

(12) United States Patent
Chan et al.

(10) Patent No.: US 12,730,010 B2
(45) Date of Patent: Sep. 8, 2026

(54) PRISM-FREE DIFFERENTIAL INTERFERENCE CONTRAST MICROSCOPE WITH TUNABLE BEAM SHEAR DISTANCE

(71) Applicants: The Hong Kong University of Science and Technology, Hong Kong (CN); Board of Regents, The University of Texas System, Richardson, TX (US)

(72) Inventors: Ka Hung Chan, Hong Kong (CN); Xian Chen, Hong Kong (CN); Zhuohui Zeng, Hong Kong (CN); Shengwang Du, Richardson, TX (US)

(73) Assignees: The Hong Kong University of Science and Technology, Hong Kong (CN); Board of Regents, The University of Texas System, Richardson, TX (US)

( * ) Notice: Subject to any disclaimer, the term of this patent is extended or adjusted under 35 U.S.C. 154(b) by 77 days.

(21) Appl. No.: 18/915,460

(22) Filed: Oct. 15, 2024

(65) Prior Publication Data

US 2025/0137850 A1 May 1, 2025

Related U.S. Application Data

(60) Provisional application No. 63/593,540, filed on Oct. 27, 2023.

(51) Int. Cl.
*G01J 9/02* (2006.01)
*G02B 21/00* (2006.01)

(52) U.S. Cl.
CPC ........ *G01J 9/0215* (2013.01); *G02B 21/0032* (2013.01); *G02B 21/0056* (2013.01); *G01J 2009/0261* (2013.01)

(58) Field of Classification Search
CPC ............ G01J 2009/0261; G01J 9/0215; G02B 21/0032; G02B 21/0056; G02B 21/14; G02B 21/361
See application file for complete search history.

(56) References Cited

U.S. PATENT DOCUMENTS 4,003,658 A * 1/1977 Kelsall .................. G01J 9/0215 356/520
7,233,434 B2 6/2007 Shribak
(Continued)

FOREIGN PATENT DOCUMENTS

CN 114137713 A 3/2022

OTHER PUBLICATIONS

Kumar et al. "Step height measurement using lateral shearing cyclic path optical configuration setup and polarization phase-shifting interferometry", Optical Engineering 51(2), 023601 (Feb. 2012) (Year: 2012).*

(Continued)

*Primary Examiner* — Hina F Ayub
(74) *Attorney, Agent, or Firm* — S&F/WEHRW

(57) ABSTRACT

A pair of light rays spatially-sheared with a controllable beam-shear distance is generated by a module having a beamsplitter (BS) and two mirrors. The BS splits an input light ray into first and second split light rays respectively propagated on first and second light paths. The two mirrors are respectively located at distal ends of the two light paths, and cause each split light ray to undergo a two-stage reflection, thereby generating first and second reflected light rays directed to the BS. The BS processes the two reflected light rays to generate the pair of spatially-sheared light rays. Orientations of the two mirrors in yaw angle, pitch angle, or both, are jointly adjustable to realize and control the beam-shear distance without using any birefringent crystal-based prism. The module is used to form differential interference contrast (DIC) microscopes providing variable shear distances, advantages of orientation independence, etc.

15 Claims, 11 Drawing Sheets

(56) References Cited

U.S. PATENT DOCUMENTS

| | | | | |
|---|---|---|---|---|
| 9,454,809 | B2 | 9/2016 | Popescu et al. | |
| 2016/0259158 | A1* | 9/2016 | Girshovitz ............. | G02B 27/52 |
| 2022/0003607 | A1 | 1/2022 | Lv et al. | |

OTHER PUBLICATIONS

Shalin B. Mehta et al., Partially coherent image formation in differential interference contrast (DIC) microscope, Optics Express, Nov. 24, 2008, vol. 16, No. 24, pp. 19462-19479.

Michael Shribak et al., Quantitative orientation-independent DIC microscope with fast switching shear direction and bias modulation, pp. 1-31.

Chan, K. H. et al., Subnanometer Accuracy of Surface Characterization by Reflected-Light Differential Interference Microscopy. Meas. Sci. Technol. 34, 025202.

Chiu, H.C. et al., Measuring optical beam shear angle of polarizing prisms beyond the diffraction limit with localization method. Optics Communications. 435, 227231.

Sanjib Chatterjee et al., White light differential interference contrast microscope with a Sagnac interferometer, Appl. Opt, vol. 53, Issue 2, pp. 296-300 (2014).

Y. Pavan Kumar et al., Small roll angle measurement using lateral shearing cyclic path polarization interferometry, Appl. Opt. 55, Issue 5, pp. 979-983 (2016).

Zeng, Z. et al., Dual beam-shear differential interference microscopy for full-field surface deformation gradient characterization, Journal of the Mechanics and Physics of Solids. 145, 104162.

* cited by examiner

PRISM-FREE DIFFERENTIAL INTERFERENCE CONTRAST MICROSCOPE WITH TUNABLE BEAM SHEAR DISTANCE

CROSS-REFERENCE TO RELATED APPLICATIONS

This application claims priority to, and the benefit of, U.S. Provisional Patent Application Ser. No. 63/593,540 filed Oct. 27, 2023, the disclosure of which is incorporated by reference herein in its entirety.

Abbreviations

BS beamsplitter
DIC differential interference contrast
PBS polarization beamsplitter

TECHNICAL FIELD

This application generally relates to an optical microscope. In particular, this application relates to a DIC microscope based on generating spatially or angularly sheared light rays without using any birefringent crystal-based prism in such generation.

BACKGROUND

A DIC microscope is a widely-used microscope for generating phase contrast images of weakly scattering specimens. This technique utilizes unique properties of birefringent crystals, such as Wollaston and Nomarski prisms, which can split an incoming light beam into two orthogonally polarized rays. These parallel rays are separated by a small spatial distance, and interact with the specimen before being recombined in the imaging path. After passing through an analyzer, the combined light rays with a specimen-induced optical phase difference produce optical interference, which gives rise to a thickness contrast of a transparent sample. This technique can also be used to measure the surface topography of opaque and reflective specimens with an accurate determination of beam-shear distance. See, for example, Chiu, H. C. (2019), "Measuring optical beam shear angle of polarizing prisms beyond the diffraction limit with localization method," *Optics Communications,* 435, 227231; Zeng, Z. (2020), "Dual beam-shear differential interference microscopy for full-field surface deformation gradient characterization," *Journal of the Mechanics and Physics of Solids,* 145, 104162; and Chan, K. H., Du, S., & Chen, X. (2022), "Subnanometer accuracy of surface characterization by reflected-light differential interference microscopy," *Meas. Sci. Technol.,* 34, 025202.

Note that the measurable range, lateral and axial resolution for the out-of-plane topography characterization is sensitive to the value of beam-shear distance. On one hand, the larger the shear distance is, the higher contrast the image shows. On the other hand, the smaller the shear distance is, the finer details the image captures. However, the shear distance of all DIC prisms is restricted by the birefringent property and the geometry, thus limiting potential of DIC prisms for optimization.

There are some techniques proposed for overcoming the aforementioned problem. For example, by using two Nomarski prisms in combination may increase the overall shear distance, and/or by adjusting the relative orientation between the prisms may alter the beam-shear angle, thus varying the beam-shear distance. However, these approaches make the microscopy system very complex. Furthermore, complicated optical parts are difficult to be aligned. Consequently, the image quality is much compromised. Two Nomarski prisms with a liquid crystal can also be used to switch shear direction electronically, as disclosed in U.S. Pat. No. 7,233,434 B2. However, the switching time for the shear direction is long and is limited by the liquid crystal.

In another approach, U.S. Pat. No. 9,454,809 suggest that interference contrast can be achieved by applying a phase mask on the Fourier plane of the microscope. This phase mask can be any diffractive optical element or spatial light modulators. Variable shear distance and direction can be achieved by changing this phase mask electronically. However, this approach requires highly spatially-coherent illumination, which can be difficult to achieve, and the cost of spatial light modulators is high. Therefore, there is a need in the art for a more efficient and cost-effective solution for realizing variable shear distance and direction in DIC microscopy.

SUMMARY

A first aspect of the present disclosure is to provide a beam shear distance module for generating first and second output light rays from a first input light ray. The first and second output light rays are separated by a beam-shear distance that is controllable.

The beam shear distance module comprises a BS, a first mirror and a second mirror. The BS is configured to split the first input light ray into first and second split light rays respectively propagated on first and second light paths. The first and second light paths define a reference vertical direction perpendicular to the first and second light paths. The first and second mirrors are located at distal ends of the first and second light paths, respectively. The first and second mirrors are oriented to cause each of the first and second split light rays to undergo a two-stage reflection such that: (1) the first split light ray yields a first reflected light ray directed to the BS and propagated along a first direction parallel to the second light path; and (2) the second split light ray yields a second reflected light ray directed to the BS and propagated along a second direction parallel to the first light path. The first and second reflected light rays are processed by the BS to yield the first and second output light rays propagated along the first direction. In addition, orientations of the first mirror and of the second mirror in yaw angle, pitch angle, or both, with respect to the reference vertical direction are jointly adjustable to control the beam-shear distance between the first and second output light rays. As a result, advantageously, the beam-shear distance is realizable, controllable and tunable without a need for using any birefringent crystal-based prism in the beam shear distance module.

In certain embodiments, the BS is realized by a plate BS, a cube BS or a PBS.

In certain embodiments, each of the first and second mirrors is a planar mirror.

In certain embodiments, the first and second mirrors are equidistant from the BS.

In certain embodiments, the beam shear distance module further comprises a first mirror mount and a second mirror mount. The first mirror is mounted on the first mirror mount. Furthermore, the first mirror mount is controllably rotatable for adjusting a first yaw angle, or a first pitch angle, or both, of the first mirror. The second mirror is mounted on the second mirror mount. The second mirror mount is controllably rotatable for adjusting a second yaw angle, or a second pitch angle, or both, of the second mirror.

In certain embodiments, each of the first and second mirror mounts is a fast-steering mirror mount.

A second aspect of the present disclosure is to provide a beam shear module for receiving a second input light ray and generating third and fourth output light rays from the second input light ray. The third and fourth output light rays undergo divergent propagation with a shear angle that is controllable.

The beam shear module comprises any of the embodiments of the beam shear distance module as disclosed above. The beam shear module further comprises a first lens and a second lens. The first lens is used for receiving the second input light ray and refracting the received second input light ray to form the first input light ray to be received by the beam shear distance module. The second lens is used for receiving the first and second output light rays exited from the beam shear distance module and diverging the received first and second output light rays to form the third and fourth output light rays divergent with the shear angle. In particular, the shear angle is controllable by controlling the beam-shear distance between the first and second output light rays.

In certain embodiments, the first and second lenses have same focal lengths.

In certain embodiments, each of the first and second lenses is realized as a single lens or a compound lens.

A third aspect of the present disclosure is to provide plural DIC microscopes each for imaging a specimen.

A first DIC microscope comprises an illumination module, a front-end PBS, a phase tuning module, an objective lens, an imaging module, and any of the embodiments of the beam shear module as disclosed herein. The illumination module is configured to provide a collimated light beam. The beam shear module is arranged to receive the collimated light beam as the second input light ray via the front-end PBS and the phase tuning module, and to forward the third and fourth output light rays to the objective lens. The objective lens is arranged to focus the third and fourth output light rays onto the specimen such that the specimen is illuminated to form a raw image of the specimen. The beam shear module is further arranged to capture the raw image through the objective lens, to convert the captured raw image into a phase contrast image of the specimen, and to transmit the phase contrast image to the front-end PBS via the phase tuning module. The phase tuning module is arranged to tune a phase of the phase contrast image before the phase contrast image reaches the front-end PBS. The front-end PBS is arranged to forward the collimated light beam to the phase tuning module, and to divert the phase contrast image to the imaging module. The imaging module is arranged to sense the phase contrast image.

In certain embodiments, the beam shear distance module in the first DIC microscope further comprises a first mirror mount on which the first mirror is mounted, and a second mirror mount on which the second mirror is mounted. The first mirror mount is controllably rotatable for adjusting a first yaw angle, or a first pitch angle, or both, of the first mirror. The second mirror mount is controllably rotatable for adjusting a second yaw angle, or a second pitch angle, or both, of the second mirror. In addition, each of the first and second mirror mounts is a fast-steering mirror mount.

A second DIC microscope comprises an illumination module, a front-end PBS, a phase tuning module, an objective lens, an imaging module, a first beam shear module, a second beam shear module and a polarization modifying unit. Each of the first and second beam shear modules is realized as any of the embodiments of the beam shear module as disclosed herein. In the second DIC microscope, a composite module for receiving a third input light ray and generating fifth and sixth output light rays from the third input light ray is formed by serially cascading the first beam shear module, the polarization modifying unit and the second beam shear module. The third input light ray is the second input light ray of the first beam shear module. The fifth and sixth output light rays are the third and fourth output light rays of the second beam shear module, respectively. The illumination module is configured to provide a collimated light beam. The composite module is arranged to receive the collimated light beam as the third input light ray via the front-end PBS and the phase tuning module, and to forward the fifth and sixth output light rays to the objective lens. The objective lens is arranged to focus the fifth and sixth output light rays onto the specimen such that the specimen is illuminated to form a raw image of the specimen. The composite module is further arranged to capture the raw image through the objective lens, to convert the captured raw image into a phase contrast image of the specimen, and to provide the phase contrast image to the front-end PBS via the phase tuning module. The phase tuning module is arranged to tune a phase of the phase contrast image before the phase contrast image reaches the front-end PBS. The front-end PBS is arranged to forward the collimated light beam to the phase tuning module, and to divert the phase contrast image to the imaging module. The imaging module is arranged to sense the phase contrast image. The polarization modifying unit in the composite module is used for rotating a shear direction of the fifth and sixth output light rays such that in imaging the specimen, the specimen needs not be oriented or inconveniently re-oriented according to a specific shear direction of the fifth and sixth output light rays.

In certain embodiments, the beam shear distance module in the second DIC microscope further comprises a first mirror mount on which the first mirror is mounted, and a second mirror mount on which the second mirror is mounted. The first mirror mount is controllably rotatable for adjusting a first yaw angle, or a first pitch angle, or both, of the first mirror. The second mirror mount is controllably rotatable for adjusting a second yaw angle, or a second pitch angle, or both, of the second mirror. In addition, each of the first and second mirror mounts is a fast-steering mirror mount.

A third DIC microscope comprises an illumination module, a polarizer, a front-end BS, a phase tuning module, an objective lens, a polarization imaging module, and any of the embodiments of the beam shear module as disclosed herein. The illumination module is configured to provide a collimated light beam. The polarizer is arranged to generate a polarized collimated light beam from the collimated light beam. The beam shear module is arranged to receive the polarized collimated light beam as the second input light ray via the front-end BS and the phase tuning module, and to forward the third and fourth output light rays to the objective lens. The objective lens is arranged to focus the third and fourth output light rays onto the specimen such that the specimen is illuminated to form a raw image of the specimen. The beam shear module is further arranged to capture the raw image through the objective lens, to convert the captured raw image into a phase contrast image of the specimen, and to transmit the phase contrast image to the front-end BS via the phase tuning module. The phase tuning module is arranged to tune a phase of the phase contrast image before the phase contrast image reaches the front-end BS. The front-end BS is arranged to forward the polarized collimated light beam to the phase tuning module, and to divert the phase contrast image to the polarization imaging module. The polarization imaging module includes a polarization image sensor for sensing the phase contrast image.

In certain embodiments, the beam shear distance module in the third DIC microscope further comprises a first mirror mount on which the first mirror is mounted, and a second mirror mount on which the second mirror is mounted. The first mirror mount is controllably rotatable for adjusting a first yaw angle, or a first pitch angle, or both, of the first mirror. The second mirror mount is controllably rotatable for adjusting a second yaw angle, or a second pitch angle, or both, of the second mirror. In addition, each of the first and second mirror mounts is a fast-steering mirror mount.

Other aspects of the present disclosure are disclosed as illustrated by the embodiments hereinafter.

Skilled artisans will appreciate that elements in the figures are illustrated for simplicity and clarity and have not necessarily been depicted to scale.

DETAILED DESCRIPTION

The present disclosure is concerned with an optical device, referred to as a beam shear distance module and formed with a BS and two mirrors, for efficiently splitting a spatially coherent or incoherent light ray into a pair of parallel beams while eliminating a need for using any birefringent crystal-based prism in splitting the light ray. The shear distance between the two parallel light rays is controllable or programmable by tuning steering angles of the two mirrors. The beam shear distance module can be developed to form a beam shear module, which converts collimated propagation of the pair of parallel light rays into divergent propagation with a shear angle that is controllable.

The disclosed beam shear distance module and bear shear module are applicable for use in a DIC microscope. As a result of efficiently controlling the shear angle, image quality and resolution obtained by such DIC microscope can be enhanced and the phase contrast can be accurately quantified. The present disclosure also provides embodiments of the DIC microscope for achieving fast switching of a shear direction. It makes the present disclosure ideal for applications that require high-speed imaging of surface topography variations, such as phase transformations, thin film wrinkling, mechanical deformations, crack formation and propagation. As such, the present disclosure provides a new means for studying surface dynamics, water evaporation process, soft matter deformation, biomechanics and solid mechanics.

A first aspect of the present disclosure is to provide a beam shear distance module for generating first and second output light rays from a first input light ray, where the first and second output light rays are separated by a beam-shear distance that is controllable. The disclosed beam shear distance module is exemplarily explained with the aid of FIGS. 1, 2, 3A, 3B, 4A and 4B. In these figures, a coordinate system 80 is used as a reference for indicating geometric aspects of different elements in the beam shear distance module. The coordinate system 80 is formed with an x-direction 81, a y-direction 82 and a z-direction 83.

Figure 1:
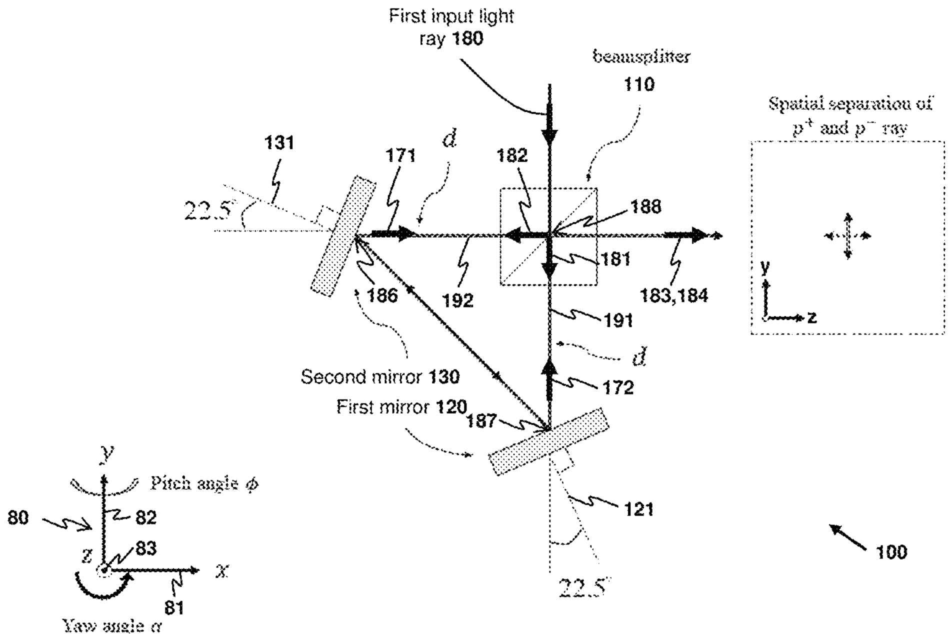
FIG. 1 depicts a schematic diagram of a beam shear distance module for generating a first output light ray and a second output light ray from a first input light ray in accordance with an exemplary embodiment of the present disclosure, where the first and second output light rays are parallel and are separated by a beam-shear distance, and the beam shear distance is under a standard configuration that results in a zero beam-shear distance.
Figure 2:
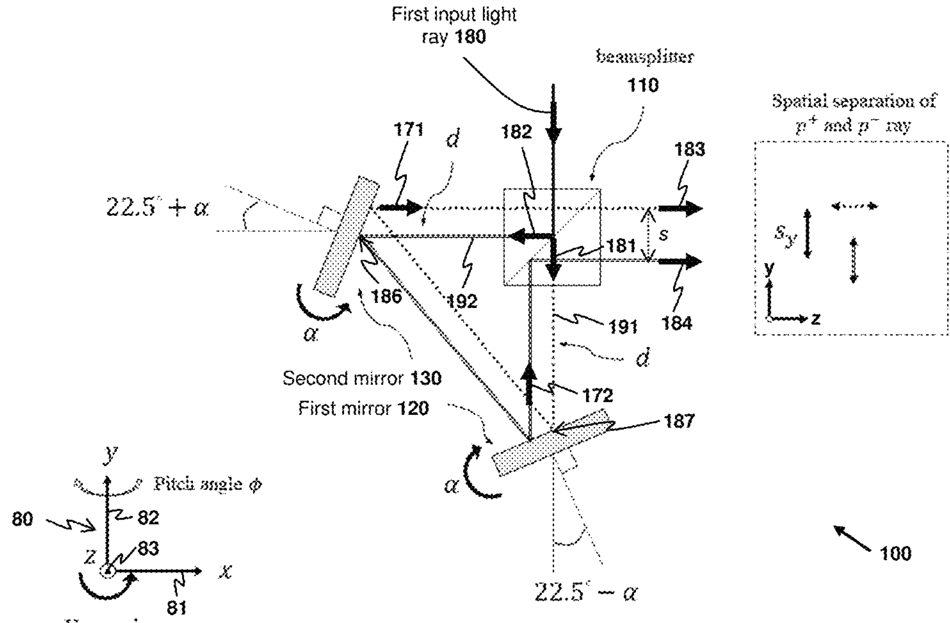
FIG. 2 depicts a configuration of the beam shear distance module for producing an optical shear along a y-direction such that beam-shear distance is positive.

FIG. 1 depicts a schematic diagram of an exemplary beam shear distance module 100 for generating a first output light ray 183 and a second output light ray 184 from a first input light ray 180, where the first and second output light rays 183, 184 are parallel and are separated by a beam-shear distance, denoted as s. For illustration purposes, the beam shear distance module 100 shown in FIG. 1 is specifically configured to have a standard configuration that results in s=0. FIG. 2 depicts a configuration of the beam shear distance module 100 for producing an optical shear along the y-direction 82 such that s is positive.

The beam shear distance module 100 comprises a BS 110, a first mirror 120 and a second mirror 130. When the first input light ray 180 is incident into the BS 110, the BS 110 splits the first input light ray 180 into two rays 181, 182, one of which is a reflected ray while another one is transmitted through the BS 110. In the end, it results in a pair of parallel rays, $p^+$ 183 and $p^-$ 184, having a precise shear distance s between the two rays 183, 184. The shear distance s is determined by the geometry of the beam shear distance module 100 with the standard configuration as shown in FIG. 1. The standard configuration gives a zero shear distance, viz., s=0. Any deviation from the standard configuration generates a positive shear distance. This precise control of shear distance allows for optimal tuning of contrast and resolution in DIC microscopy.

Structural and operational details of the beam shear distance module 100 are elaborated as follows.

The BS 110 is configured to split the first input light ray 180 into a first split light ray 181 and a second split light ray 182. The first split light ray 181 is propagated on a first light path 191, and the second split light ray 182 is propagated on a second light path 192. Furthermore, the first and second light paths 191, 192 defines a reference vertical direction perpendicular to the first and second light paths 191, 192. In FIGS. 1, 2, 3A, 3B, 4A and 4B, the reference vertical direction is the z-direction 83. For convenience, the reference vertical direction is referenced as 83. The reference vertical direction 83 defines a yaw axis of each of the first and second mirrors 120, 130. The yaw axis of an individual mirror selected from the first and second mirrors 120, 130 is an axis of the individual mirror in parallel to the reference vertical direction 83. A yaw angle (denoted as a) of the individual mirror is an angle of rotation about the yaw axis. A pitch axis of the individual mirror is an axis perpendicular to the yaw axis thereof. A pitch angle (denoted as Ø) of the individual mirror is an angle of rotation about the pitch axis.

Note that in FIG. 1 and also in FIGS. 2, 3A, 3B, 4A and 4B, the first and second light paths 191, 192 are drawn to be mutually orthogonal as an example for illustration. Physically, the two light paths 191, 192 are mutually orthogonal if the BS 110 is selected to be a PBS. For other types of BS, the first and second split light rays 181, 182 propagate along their respective paths so that an intersection angle between the two light paths 191, 192 depends on the type of BS used for the BS 110 and may not be 90°.

Refer to FIGS. 1 and 2. The first mirror 120 is located at a distal end 187 of the first light path 191. The second mirror 130 is located at a distal end 186 of the second light path 192. Note that the first and second light paths 191, 192 has a common proximal end 188, where the first input light ray 180 is split into the first and second split light rays 181, 182. Furthermore, the first and second mirrors 120, 130 are oriented to achieve the following two effects. First, the first split light ray 181 is sequentially reflected by the first mirror 120 and then the second mirror 130 to form a first reflected light ray 171 directed to the BS 110 and propagated along a first direction parallel to the second light path 192. Second, the second split light beam 182 is sequentially reflected by the second mirror 130 and then the first mirror 120 to form a second reflected light ray 172 directed to the BS 110 and propagated along a second direction parallel to the first light path 191. Note that the first direction is the x-direction 81, and the second direction is the y-direction 82. For convenience, the first and second directions are referenced as 81 and 82, respectively. Equivalently, the first and second mirrors 120, 130 are oriented to cause each of the first and second split light rays 181, 182 to undergo a two-stage reflection such that: (1) the first split light ray 181 yields the first reflected light ray 171 directed to the BS 110 and propagated along the first direction 81; and (2) the second split light ray 182 yields the second reflected light ray 172 directed to the BS 110 and propagated along the second direction 82. The BS 110 is then reused to process the first reflected light ray 171 and the second reflected light ray 172 to yield the first output light ray 183 and the second output light ray 184, respectively. Note that the first and second output light rays 183, 184 are propagated along the first direction 81.

Refer to FIG. 1. Under the standard configuration, the first and second output light rays 183, 184 are combined together to form one single light ray such that s=0. In the standard configuration, a central axis 121 of the first mirror 120 makes a first angle of 22.5° with the first light path 191, and a central axis 131 of the second mirror 130 makes a second angle of 22.5° with the second light path 192. Note that the beam shear distance module 100 shown in FIG. 1 is a special case that the first and second mirrors 120, 130 are equidistant to the BS 110. The separation between the BS 110 and each of the first and second mirrors 120, 130 is d. Although this special case gives a convenient, simple configuration in practical implementation of the beam shear distance module 100, the present disclosure is not limited to this special case in realizing the disclosed beam shear distance module. Those skilled in the art will appreciate that in a more general case of the beam shear distance module 100 that the the first and second mirrors 120, 130 are not equidistant to the BS 110, the corresponding first and second angles for achieving s=0 can be readily derived or estimated.

The configuration of the beam shear distance module 100 as shown in FIG. 2 enables generation of an optical shear. It can be shown that, under the above-mentioned special case that the first and second mirrors 120, 130 are equidistant to the BS 110, the shear distance produced along the y-direction 82, denoted as $s_y$, is calculated by $$s_y = |2d\sin(2\alpha)|$$

where α is the yaw angle of each of the first and second mirrors 120, 130 with respect to a horizontal direction, e.g., a direction along the x-direction 81 or the z-direction 83.

Figure 3A:
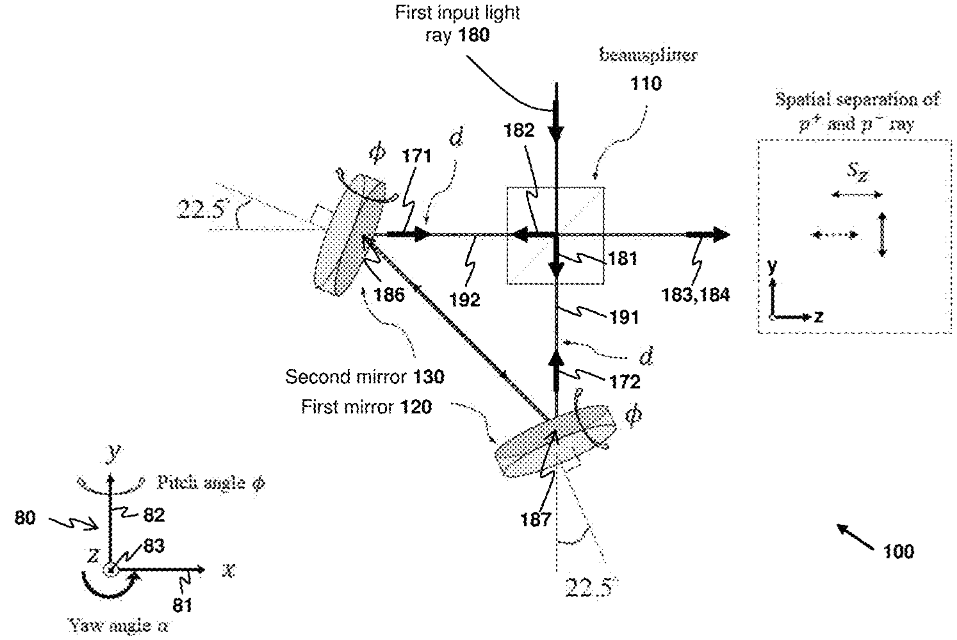
FIG. 3A depicts a top view of the beam shear distance module arranged to produce an optical shear along a z-direction.
Figure 3B:
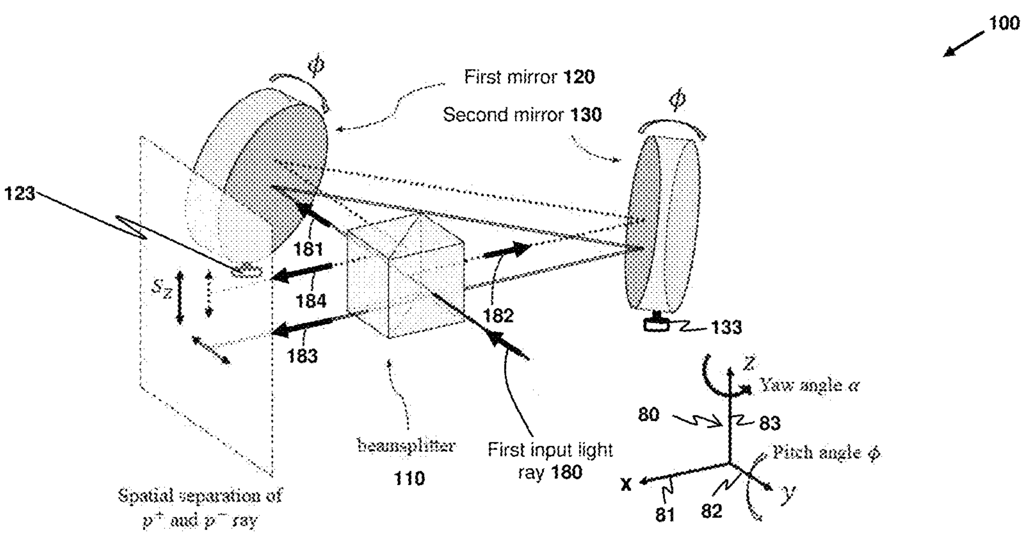
FIG. 3B depicts a perspective view of the beam shear distance module arranged to produce the optical shear along the z-direction.

FIGS. 3A and 3B depict a top view and a perspective view, respectively, of the beam shear distance module 100 arranged to produce an optical shear along the z-direction 83. It can be shown that, under the above-mentioned special case, the shear distance along the z-direction 83, denoted by $s_z$, is calculated as $$s_z = |2d\sin(2\phi)|$$

where ϕ is the pitch angle of each of the first and second mirrors 120, 130.

Figure 4A:
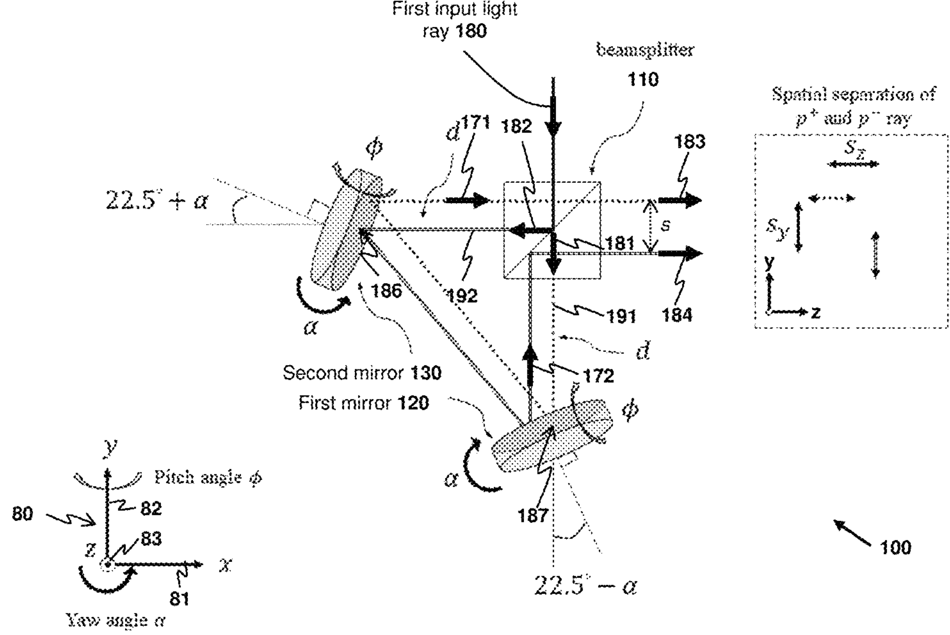
FIG. 4A depicts a top view of the beam shear distance module arranged to generate an optical shear along both the y- and z-directions.
Figure 4B:
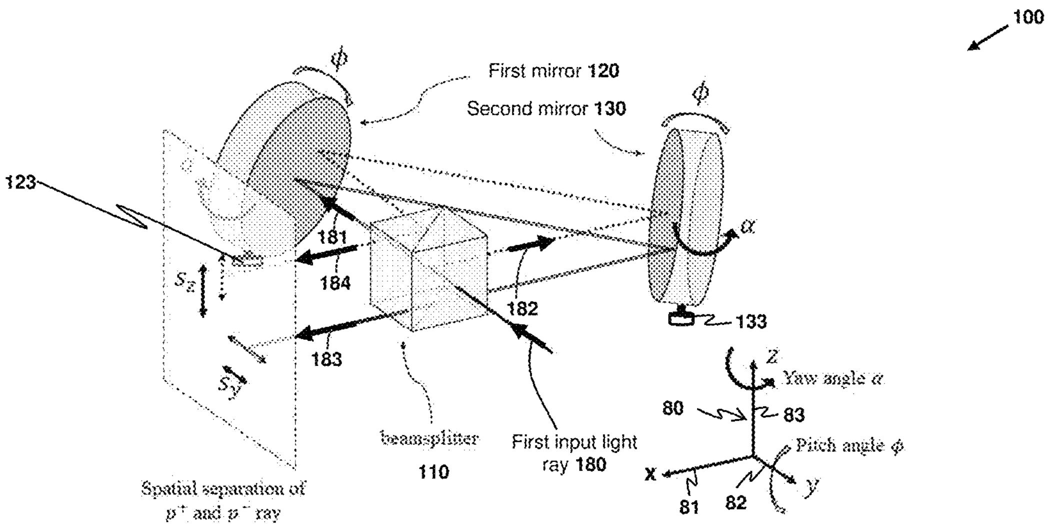
FIG. 4B depicts a perspective view of the beam shear distance module arranged to generate the optical shear along both the y- and z-directions.

FIGS. 4A and 4B depict a top view and a perspective view, respectively, of the beam shear distance module 100 arranged to generate an optical shear along both the y- and z-directions 82, 83 by simultaneously changing the yaw angle α and the pitch angle ϕ of each of the first and second mirrors 120, 130.

In FIGS. 3A and 3B, it is shown that a non-zero shear distance s is obtained by jointly adjusting the two pitch angles of the first and second mirrors 120, 130 with a same angle. Similarly, in FIGS. 4A and 4B, a non-zero shear distance is obtained by jointly adjusting the two pitch angles of the first and second mirrors 120, 130 with a same first angle and also jointly adjusting the two yaw angles thereof with a same second angle. Note that the beam shear distance module 100 as shown in FIGS. 3A, 3B, 4A and 4B has the first and second mirrors 120, 130 equidistant to the BS 110. Those skilled in the art will appreciate that in a more general case of the beam shear distance module 100 that the first and second mirrors 120, 130 are not equidistant to the BS 110, the corresponding pitch and yaw angles for the first and second mirrors 120, 130 to cooperatively achieve a given non-zero shear distance can be readily derived or estimated.

Summarizing the foregoing analysis indicates that in the beam shear distance module 100, orientations of the first mirror 120 and of the second mirror 130 in yaw angle, pitch angle, or both, with respect to the reference vertical direction 83 are jointly adjustable to control the beam-shear distance s between the first and second output light rays 183, 184. As a result, it achieves an advantage that the beam-shear distance s is realizable, controllable and tunable without a need for using any birefringent crystal-based prism, such as conventional Wollaston prism and Nomarski prism, in the beam shear distance module 100.

In certain embodiments, the BS 110 is realized by a plate BS, a cube BS or a PBS.

In general, it is required to maintain only a part of mirror surface on each of the first and second mirrors 120, 130 to be flat where the foresaid part of mirror surface covers an area sufficiently large for reflecting the first and second split light rays 181, 182 under all configurations. In certain embodiments, each of the first and second mirrors 120, 130 is a planar mirror such that the entire mirror surface is flat.

In certain embodiments, the beam shear distance module 100 further comprises a first mirror mount 123 and a second mirror mount 133, where the first mirror 120 is mounted on the first mirror mount 123, and the second mirror 130 is mounted on the second mirror mount 133. In particular, the first mirror mount 123 is controllably rotatable for adjusting a first yaw angle, a first pitch angle, or both, of the first mirror 120. Similarly, the second mirror mount 133 is controllably rotatable for adjusting a second yaw angle, a second pitch angle, or both, of the second mirror 130. Those skilled in the art will be able to determine how to control or jointly control the first and second mirror mounts 123, 133 to achieve desired yaw and pitch angles for the first and second mirrors 120, 130 according to practical situations. For example, a programmable electronic microcontroller may be used to jointly control the two mirror mounts 123, 133.

In certain embodiments, each of the first and second mirror mounts 123, 133 is a fast-steering mirror mount. The fast-steering mirror mount may be realized as an electronic mirror mount. Since each of the first and second mirrors 120, 130 driven by fast-steering mirror mounts has a response time faster than that of a liquid crystal, it allows for switching between shear directions with a frequency greater than 1000 Hz. The beam shear distance module 100 is capable of shearing in both the y-direction 82 and z-direction 83 by changing the yaw and pitch angles of the individual mirror. This design allows for accurate and rapid switching between the two states.

A second aspect of the present disclosure is to provide a beam shear module for generating third and fourth output light rays from a second input light ray, where the third and fourth output light rays undergo divergent propagation with a shear angle that is controllable. The disclosed beam shear module is developed based on the beam shear distance module 100.

Figure 5:
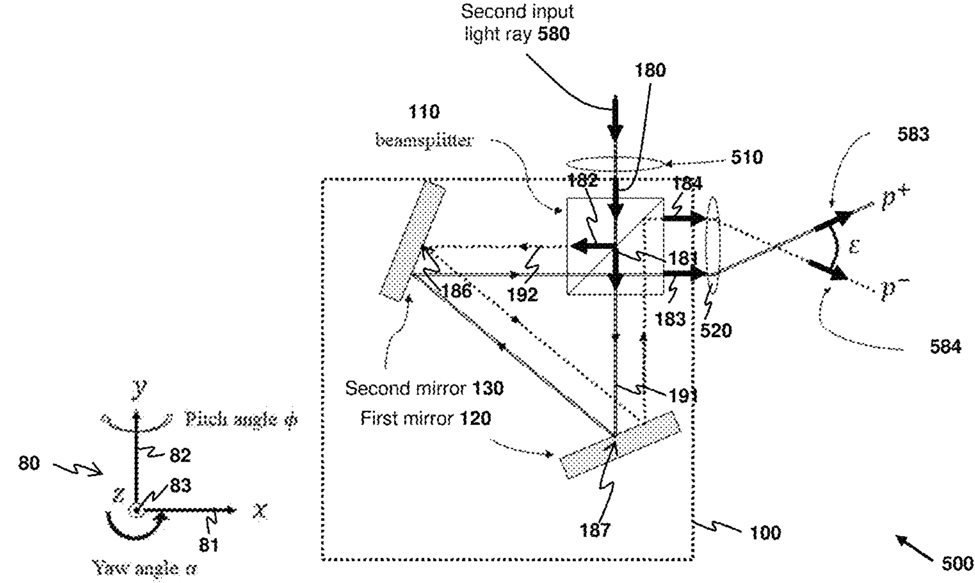
FIG. 5 depicts a schematic diagram of a beam shear module, developed based on the beam shear distance module, for generating third and fourth output light rays from a second input light ray, where the third and fourth output light rays undergo divergent propagation with a shear angle.

FIG. 5 depicts a schematic diagram of an exemplary beam shear module 500 for receiving a second input light ray 580 and generating a third output light ray 583 and a fourth output light ray 584 from the second input light ray 580. Particularly, the third and fourth output light rays 583, 584 undergo divergent propagation with a shear angle, E, that is controllable.

The beam shear module 500 comprises the beam shear distance module 100, a first lens 510 and a second lens 520. The beam shear distance module 100 is regarded as any of the embodiments of the beam shear distance module 100 as disclosed above. The first lens 510 is used for receiving the second input light ray 580 and refracting the received second input light ray 580 to form the first input light ray 180 to be received by the beam shear distance module 100. The second lens 520 is used for receiving the first and second output light rays 183, 184 exited from the beam shear distance module 100 and diverging the received first and second output light rays 183, 184 to respectively form the third and fourth output light rays 583, 584. In particular, the third and fourth output light rays 583, 584 are divergent with the shear angle $\epsilon$. Advantageously, the shear angle is controllable by controlling the beam-shear distance s between the first and second output light rays 183, 184. Note that with the first and second lenses 510, 520, the two spatially-sheared light rays 183, 184 are converted from collimated propagation to divergent propagation with the shear angle. A relative shear angle is purely dependent on the shear distance s produced by the beam shear distance module 100 and a focal length of the second lens 520. It follows that e is given by $$\varepsilon = \frac{s}{f}$$

where f is a focal length of the second lens 520.

Other implementation details of the beam shear module 500 are provided as follows. In certain embodiments, the first and second lenses 510, 520 have same focal lengths. It is also possible that the first and second lenses 510, 520 have different focal lengths. Each of the first and second lenses 510, 520 may be realized as a single lens or a compound lens.

Practically, the beam shear module 500 can be used in a variety of imaging systems, including DIC microscopes.

A third aspect of the present disclosure is to provide a plurality of DIC microscopes developed by utilizing the beam shear module 500 as disclosed above.

Figure 6:
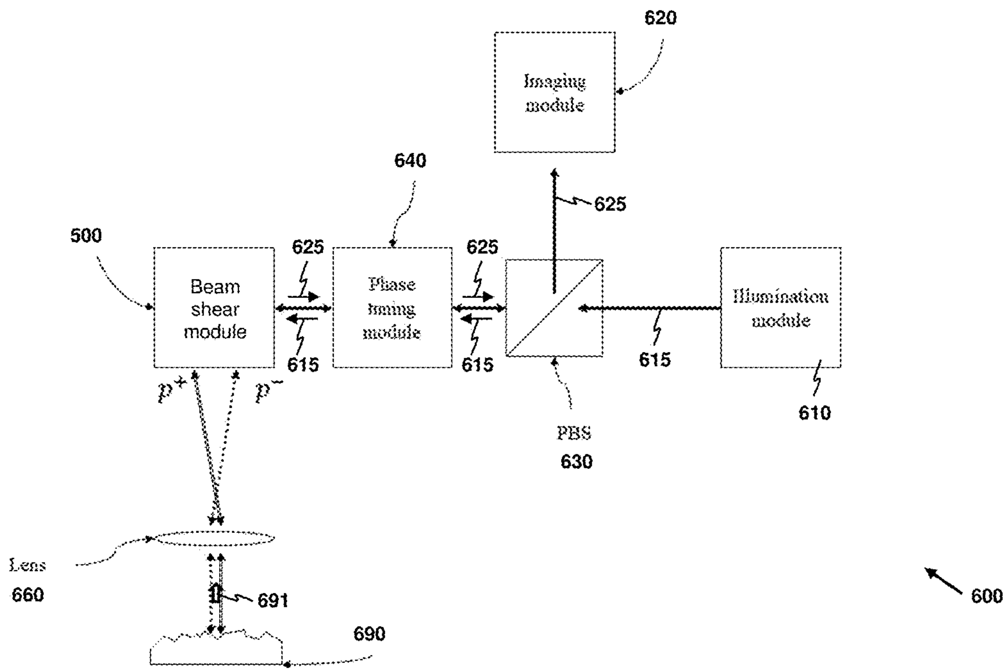
FIG. 6 depicts a schematic diagram of a first DIC microscope configured to provide a variable shear distance for a pair of light rays used in imaging a specimen.

FIG. 6 depicts a schematic diagram of a first DIC microscope 600 for imaging a specimen 690, where the first DIC microscope 600 is configured to provide a variable shear distance for a pair of light rays used in imaging the specimen 690. Advantageously, the configuration of the first DIC microscope 600 provides high-quality phase images with improved contrast and resolution. The first DIC microscope 600 may be referred to as a variable shear distance DIC microscope.

The first DIC microscope 600 comprises an illumination module 610, a front-end PBS 630, a phase tuning module 640, an objective lens 660, an imaging module 620, and the beam shear module 500. The beam shear module 500 is regarded as any of the embodiments of the beam shear module 500 as disclosed above. The illumination module 610 is configured to provide a collimated light beam 615. The beam shear module 500 is arranged to receive the collimated light beam 615 as the second input light ray 580 via the front-end PBS 630 and the phase tuning module 640, and to forward the third and fourth output light rays 583, 584 to the objective lens 660. The objective lens 660, placed after the beam shear module 500, is arranged to focus the third and fourth output light rays 583, 584 onto the specimen 690 such that the specimen 690 is illuminated to form a raw image 691 of the specimen 690. The objective lens 660 can be any lens with a focal length different from the focal length of the second lens 520 of the beam shear module 500. The beam shear module 500 is further arranged to capture the raw image 691 through the objective lens 660, to convert the captured raw image 691 into a phase contrast image 625 of the specimen 690, and to transmit the phase contrast image 625 to the front-end PBS 630 via the phase tuning module 640. The phase tuning module 640 is arranged to tune a phase of the phase contrast image 625 before the phase contrast image 625 reaches the front-end PBS 630. Furthermore, an optical axis of the phase tuning module 640 is aligned with that of the beam shear module 500. The front-end PBS 630 is arranged to forward the collimated light beam 615 to the phase tuning module 640, and to divert the phase contrast image 625 to the imaging module 620. It follows that the front-end PBS 630 is used to separate illumination and imaging paths. Furthermore, the front-end PBS 630 is oriented at a 45-degree angle with respect to the beam shear module 500. The imaging module 620 is arranged to sense the phase contrast image 625.

Figure 7:
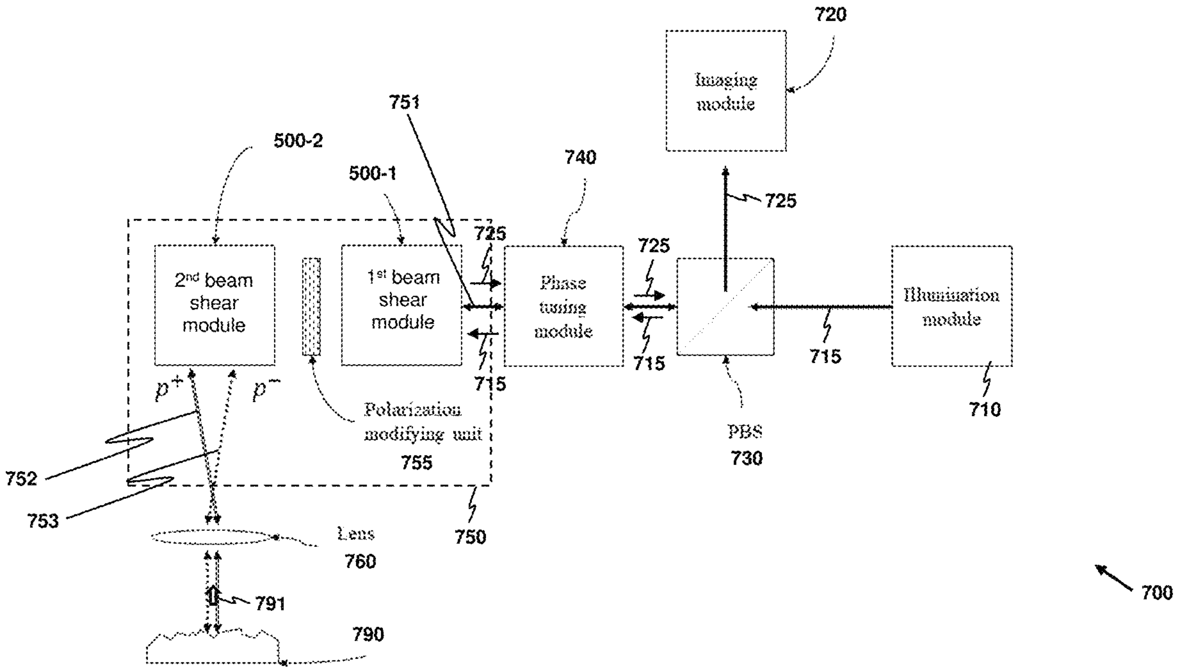
FIG. 7 depicts a schematic diagram of a second DIC microscope configured to provide a variable shear distance for a pair of light rays used in imaging a specimen while the specimen needs not be oriented or inconveniently re-oriented according to a specific shear direction provided by the pair of light rays.

FIG. 7 depicts a schematic diagram of a second DIC microscope 700 for imaging a specimen 790, where the second DIC microscope 700 is configured to provide a variable shear distance for a pair of light rays used in imaging the specimen 790 while the specimen 790 needs not be oriented or inconveniently re-oriented according to a specific shear direction provided by the pair of light rays. Advantageously, the configuration of the second DIC microscope 600 provides high-quality phase images with improved contrast and resolution while avoiding a need for inconveniently orienting the specimen 790 before microscope inspection. The second DIC microscope 700 may be referred to as an orientation-independent variable shear distance DIC microscope.

The second DIC microscope 700 comprises an illumination module 710, a front-end PBS 730, a phase tuning module 740, an objective lens 760, an imaging module 720, a first beam shear module 500-1, a second beam shear module 500-2 and a polarization modifying unit 755. Each of the first and second beam shear modules 500-1, 500-2 is implemented as a realization of the beam shear module 500. The beam shear module 500 is regarded as any of the embodiments of the beam shear module 500 as disclosed above. In the second DIC microscope 700, a composite module 750 for receiving a third input light ray 751 and generating a fifth output light ray 752 and a sixth output light ray 753 from the third input light ray 751 is formed by serially cascading the first beam shear module 500-1, the polarization modifying unit 755 and the second beam shear module 500-2. In addition, the polarization modifying unit 755 has an optical axis positioned at a 45° angle with respect to an optical axis of the first beam shear module 500-1. Specifically, the third input light ray 751 is the second input light ray 580 of the first beam shear module 500-1. Furthermore, the fifth and sixth output light rays 752, 753 are the third and fourth output light rays 583, 584 of the second beam shear module 500-2, respectively. The illumination module 710 is configured to provide a collimated light beam 715. The composite module 750 is arranged to receive the collimated light beam 715 as the third input light ray 751 via the front-end PBS 730 and the phase tuning module 740, and to forward the fifth and sixth output light rays 752, 753 to the objective lens 760. The objective lens 760 is arranged to focus the fifth and sixth output light rays 752, 753 onto the specimen 790 such that the specimen 790 is illuminated to form a raw image 791 of the specimen 790. The composite module 750 is further arranged to capture the raw image 791 through the objective lens 760, to convert the captured raw image 791 into a phase contrast image 725 of the specimen 790, and to provide the phase contrast image 725 to the front-end PBS 730 via the phase tuning module 740. The phase tuning module 740 is arranged to tune a phase of the phase contrast image 725 before the phase contrast image 725 reaches the front-end PBS 730. The front-end PBS 730 is arranged to forward the collimated light beam 715 to the phase tuning module 740, and to divert the phase contrast image 725 to the imaging module 720. The imaging module 720 is arranged to sense the phase contrast image 725. Advantageously, the polarization modifying unit 755 in the composite module 750 is used for rotating a shear direction of the fifth and sixth output light rays 752, 753 such that in imaging the specimen 790, the specimen 790 needs not be oriented or inconveniently re-oriented according to a specific shear direction of the fifth and sixth output light rays 752, 753.

Figure 8:
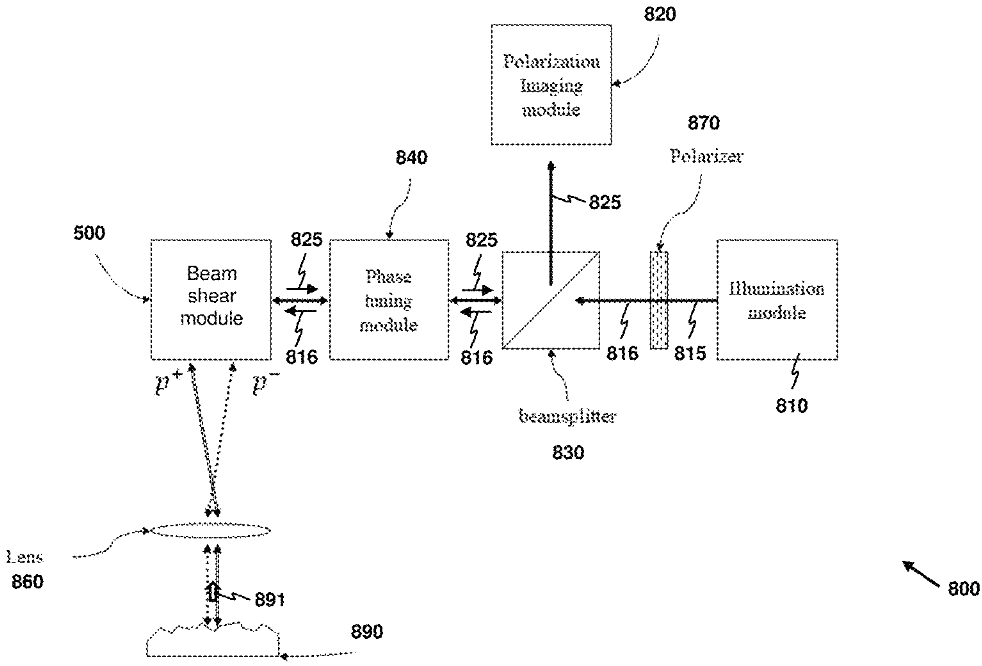
FIG. 8 depicts a schematic diagram of a third DIC microscope configured to provide polarized light to image a specimen.

FIG. 8 depicts a schematic diagram of a third DIC microscope 800 for imaging a specimen 890, where the third DIC microscope 800 is configured to provide polarized light to image the specimen 890. Since polarized light is used in imaging the specimen 890, one main application of the third DIC microscope 800 is to detect a phase field of the specimen 890. Furthermore, all liquid crystal elements are removed from the third DIC microscope 800. The phase field can be detected using a polarization camera similar to the third DIC microscope 800. The third DIC microscope 800 is able to determine a state of polarization of a DIC image. The state of polarization is related to the gradient of surface topography. Therefore, the third DIC microscope 800 can directly detect the phase field without using a liquid crystal. The third DIC microscope 800 may be referred to as a single-shot fast-switching dual-shear DIC microscope.

The third DIC microscope 800 comprises an illumination module 810, a polarizer 870, a front-end BS 830, a phase tuning module 840, an objective lens 860, a polarization imaging module 820, and the beam shear module 500. The beam shear module 500 is regarded as any of the embodiments of the beam shear module 500 as disclosed above. The illumination module 810 is configured to provide a collimated light beam 815. The polarizer 870 is arranged to generate a polarized collimated light beam 816 from the collimated light beam 815. The beam shear module 500 is arranged to receive the polarized collimated light beam 816 as the second input light ray 580 via the front-end BS 830 and the phase tuning module 840, and to forward the third and fourth output light rays 583, 584 to the objective lens 860. The objective lens 860 is arranged to focus the third and fourth output light rays 583, 584 onto the specimen 890 such that the specimen 890 is illuminated to form a raw image 891 of the specimen 890. The beam shear module 500 is further arranged to capture the raw image 891 through the objective lens 860, to convert the captured raw image 891 into a phase contrast image 825 of the specimen 890, and to transmit the phase contrast image 825 to the front-end BS 830 via the phase tuning module 840. The phase tuning module 840 is arranged to tune a phase of the phase contrast image 825 before the phase contrast image 825 reaches the front-end BS 830. The front-end BS 830 is arranged to forward the polarized collimated light beam 816 to the phase tuning module 840, and to divert the phase contrast image 825 to the polarization imaging module 820. The polarization imaging module 820 includes a polarization image sensor for sensing the phase contrast image 825.

Advantageously, the beam shear module 500 used in any of the first, second and third DIC microscopes 600, 700, 800 may be installed with the first and second mirror mounts 123, 133 that are fast-steering mirror mounts. It allows the DIC microscope under consideration to achieve high-speed inspection of specimens.

Figure 9A:
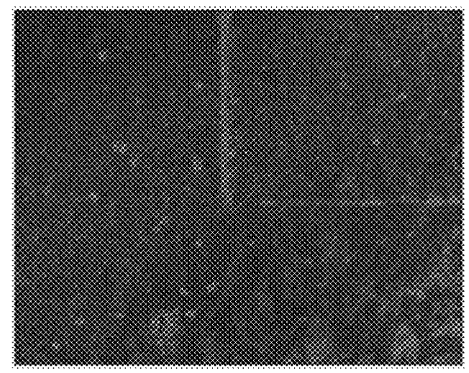
FIG. 9A depicts, as experimental demonstration, a first image of a specimen observed by the first DIC microscope under horizontally-sheared light rays.
Figure 9B:
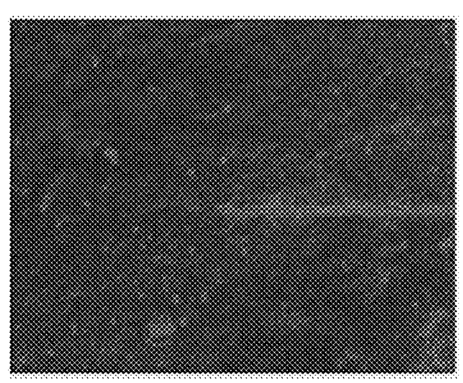
FIG. 9B depicts, as experimental demonstration, a second image of the specimen observed under the first DIC microscope under vertically-sheared light rays.

An experimental demonstration of disclosed DIC microscopes is provided as follows by measuring a step-like structure using the first DIC microscope 600 as disclosed above. When light rays $p^+$ 183 and $p^-$ 184 illuminate on the step-like structure and are reflected back, the phase leg between the two light rays is two times of the step height. In most existing DIC microscopes, shear distances that are employed are respectively lower than resolutions of these microscopes. It leads to some distortion in an intensity profile under examination. The measured phase shift is therefore smaller than the actual step height. By increasing the shear distance, the step can be clearly and measured accurately by the first DIC microscope 600, as shown in FIGS. 9A and 9B. FIG. 9A depicts a first image of a specimen observed under horizontally-sheared light rays. FIG. 9B is a second image of the specimen observed under vertically-sheared light rays.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A beam shear distance module for generating first and second output light rays from a first input light ray, the first and second output light rays being separated by a beam-shear distance that is controllable, the beam shear distance module comprising:

- a beamsplitter (BS) configured to split the first input light ray into first and second split light rays respectively propagated on first and second light paths, the first and second light paths defining a reference vertical direction perpendicular to the first and second light paths; and
- first and second mirrors respectively located at distal ends of the first and second light paths, the first and second mirrors being oriented to cause each of the first and second split light rays to undergo a two-stage reflection such that the first split light ray yields a first reflected light ray directed to the BS and propagated along a first direction parallel to the second light path and such that the second split light ray yields a second reflected light ray directed to the BS and propagated along a second direction parallel to the first light path, the first and second reflected light rays being processed by the BS to yield the first and second output light rays propagated along the first direction, wherein orientations of the first mirror and of the second mirror in yaw angle, pitch angle, or both, with respect to the reference vertical direction are jointly adjustable to control the beam-shear distance between the first and second output light rays such that the beam-shear distance is realizable, controllable and tunable without a need for using any birefringent crystal-based prism in the beam shear distance module.

2. The beam shear distance module of claim 1, wherein the BS is realized by a plate BS, a cube BS or a PBS.

3. The beam shear distance module of claim 1, wherein each of the first and second mirrors is a planar mirror.

4. The beam shear distance module of claim 1, wherein the first and second mirrors are equidistant from the BS.

5. The beam shear distance module of claim 1 further comprising:

- a first mirror mount on which the first mirror is mounted, the first mirror mount being controllably rotatable for adjusting a first yaw angle, or a first pitch angle, or both, of the first mirror; and
- a second mirror mount on which the second mirror is mounted, the second mirror mount being controllably rotatable for adjusting a second yaw angle, or a second pitch angle, or both, of the second mirror.

6. The beam shear distance module of claim 5, wherein each of the first and second mirror mounts is a fast-steering mirror mount.

7. A beam shear module for receiving a second input light ray and generating third and fourth output light rays from the second input light ray, the third and fourth output light rays undergoing divergent propagation with a shear angle that is controllable, the beam shear module comprising:

- the beam shear distance module of claim 1;
- a first lens for receiving the second input light ray and refracting the received second input light ray to form the first input light ray to be received by the beam shear distance module; and
- a second lens for receiving the first and second output light rays exited from the beam shear distance module and diverging the received first and second output light rays to form the third and fourth output light rays divergent with the shear angle, wherein the shear angle is controllable by controlling the beam-shear distance between the first and second output light rays.

8. The beam shear module of claim 7, wherein the first and second lenses have same focal lengths.

9. The beam shear module of claim 7, wherein each of the first and second lenses is realized as a single lens or a compound lens.

10. A differential interference contrast (DIC) microscope for imaging a specimen, the DIC microscope comprising an illumination module, a front-end polarization beamsplitter (PBS), a phase tuning module, an objective lens, an imaging module, and the beam shear module of claim 7, wherein:

- the illumination module is configured to provide a collimated light beam;
- the beam shear module is arranged to receive the collimated light beam as the second input light ray via the front-end PBS and the phase tuning module, and to forward the third and fourth output light rays to the objective lens;
- the objective lens is arranged to focus the third and fourth output light rays onto the specimen such that the specimen is illuminated to form a raw image of the specimen;
- the beam shear module is further arranged to capture the raw image through the objective lens, to convert the captured raw image into a phase contrast image of the specimen, and to transmit the phase contrast image to the front-end PBS via the phase tuning module;
- the phase tuning module is arranged to tune a phase of the phase contrast image before the phase contrast image reaches the front-end PBS;
- the front-end PBS is arranged to forward the collimated light beam to the phase tuning module, and to divert the phase contrast image to the imaging module; and
- the imaging module is arranged to sense the phase contrast image.

11. The DIC microscope of claim 10, wherein the beam shear distance module further comprises:

a first mirror mount on which the first mirror is mounted, the first mirror mount being controllably rotatable for adjusting a first yaw angle, or a first pitch angle, or both, of the first mirror; and a second mirror mount on which the second mirror is mounted, the second mirror mount being controllably rotatable for adjusting a second yaw angle, or a second pitch angle, or both, of the second mirror;

wherein each of the first and second mirror mounts is a fast-steering mirror mount.

12. A differential interference contrast (DIC) microscope for imaging a specimen, the DIC microscope comprising an illumination module, a front-end polarization beamsplitter (PBS), a phase tuning module, an objective lens, an imaging module, a first beam shear module, a second beam shear module and a polarization modifying unit, wherein:

each of the first and second beam shear modules is realized as the beam shear module of claim 7;

a composite module for receiving a third input light ray and generating fifth and sixth output light rays from the third input light ray is formed by serially cascading the first beam shear module, the polarization modifying unit and the second beam shear module, wherein the third input light ray is the second input light ray of the first beam shear module, and wherein the fifth and sixth output light rays are the third and fourth output light rays of the second beam shear module, respectively;

the illumination module is configured to provide a collimated light beam;

the composite module is arranged to receive the collimated light beam as the third input light ray via the front-end PBS and the phase tuning module, and to forward the fifth and sixth output light rays to the objective lens;

the objective lens is arranged to focus the fifth and sixth output light rays onto the specimen such that the specimen is illuminated to form a raw image of the specimen;

the composite module is further arranged to capture the raw image through the objective lens, to convert the captured raw image into a phase contrast image of the specimen, and to provide the phase contrast image to the front-end PBS via the phase tuning module;

the phase tuning module is arranged to tune a phase of the phase contrast image before the phase contrast image reaches the front-end PBS;

the front-end PBS is arranged to forward the collimated light beam to the phase tuning module, and to divert the phase contrast image to the imaging module;

the imaging module is arranged to sense the phase contrast image; and the polarization modifying unit in the composite module is used for rotating a shear direction of the fifth and sixth output light rays such that in imaging the specimen, the specimen needs not be oriented or inconveniently re-oriented according to a specific shear direction of the fifth and sixth output light rays.

13. The DIC microscope of claim 12, wherein each of the first and second beam shear module further comprises:

a first mirror mount on which the first mirror is mounted, the first mirror mount being controllably rotatable for adjusting a first yaw angle, or a first pitch angle, or both, of the first mirror; and a second mirror mount on which the second mirror is mounted, the second mirror mount being controllably rotatable for adjusting a second yaw angle, or a second pitch angle, or both, of the second mirror;

wherein each of the first and second mirror mounts is a fast-steering mirror mount.

14. A differential interference contrast (DIC) microscope for imaging a specimen, the DIC microscope comprising an illumination module, a polarizer, a front-end beamsplitter (BS), a phase tuning module, an objective lens, a polarization imaging module, and the beam shear module of claim 7, wherein:

the illumination module is configured to provide a collimated light beam;

the polarizer is arranged to generate a polarized collimated light beam from the collimated light beam;

the beam shear module is arranged to receive the polarized collimated light beam as the second input light ray via the front-end BS and the phase tuning module, and to forward the third and fourth output light rays to the objective lens;

the objective lens is arranged to focus the third and fourth output light rays onto the specimen such that the specimen is illuminated to form a raw image of the specimen;

the beam shear module is further arranged to capture the raw image through the objective lens, to convert the captured raw image into a phase contrast image of the specimen, and to transmit the phase contrast image to the front-end BS via the phase tuning module;

the phase tuning module is arranged to tune a phase of the phase contrast image before the phase contrast image reaches the front-end BS;

the front-end BS is arranged to forward the polarized collimated light beam to the phase tuning module, and to divert the phase contrast image to the polarization imaging module; and the polarization imaging module includes a polarization image sensor for sensing the phase contrast image.

15. The DIC microscope of claim 14, wherein the beam shear distance module further comprises:

a first mirror mount on which the first mirror is mounted, the first mirror mount being controllably rotatable for adjusting a first yaw angle, or a first pitch angle, or both, of the first mirror; and a second mirror mount on which the second mirror is mounted, the second mirror mount being controllably rotatable for adjusting a second yaw angle, or a second pitch angle, or both, of the second mirror;

wherein each of the first and second mirror mounts is a fast-steering mirror mount.

* * * * *